July 1, 1930. LE ROY JONES 1,769,515
AUTOMOBILE VISOR
Filed Aug. 13, 1929 2 Sheets-Sheet 2
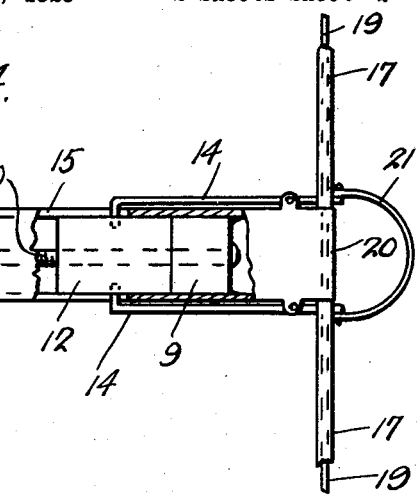
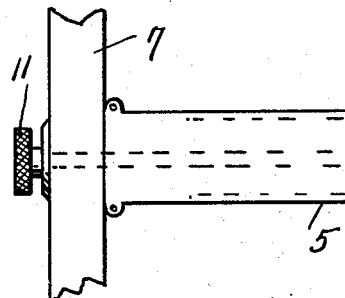
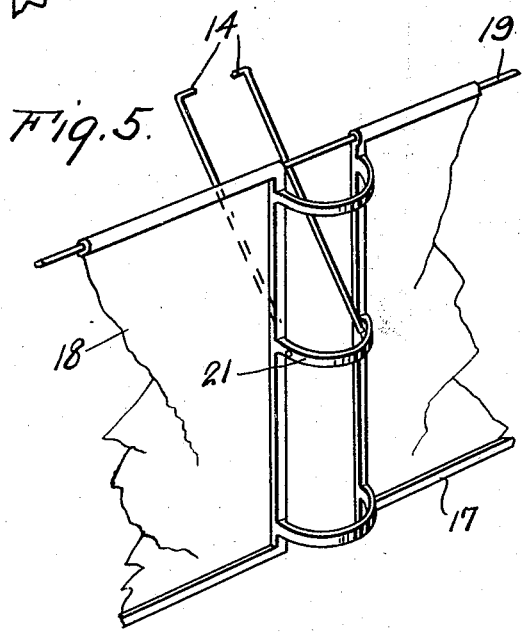
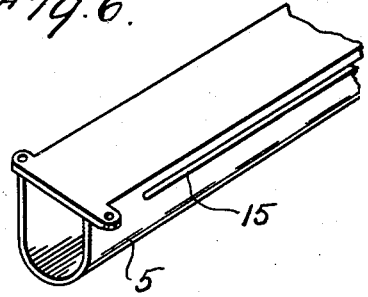
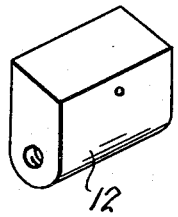
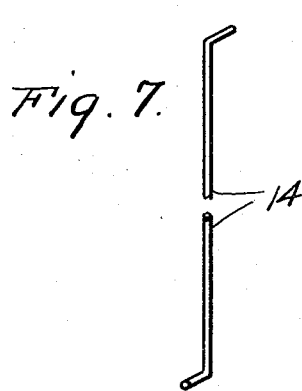
Inventor
LeRoy Jones
By Clarence A O'Brien
Attorney

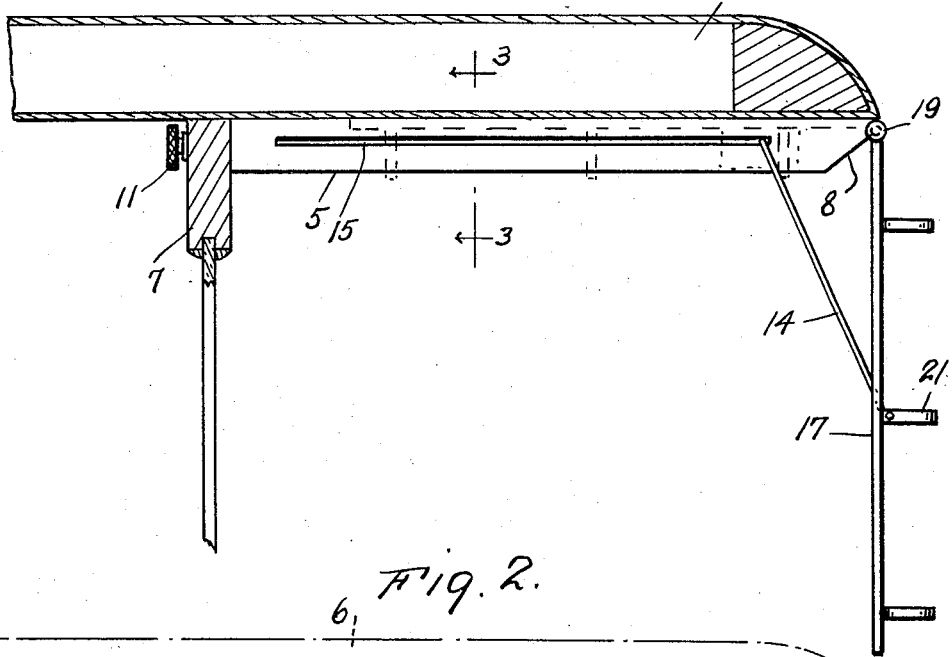
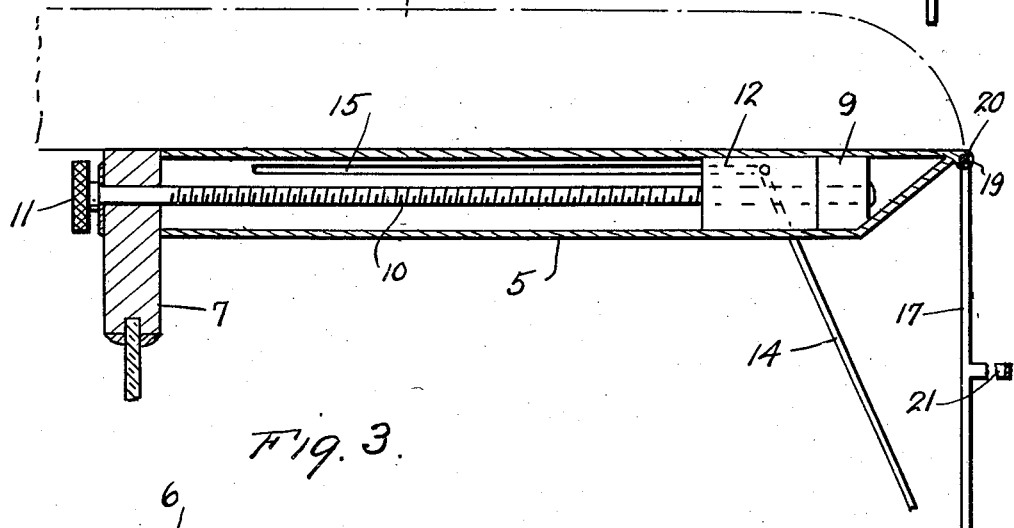
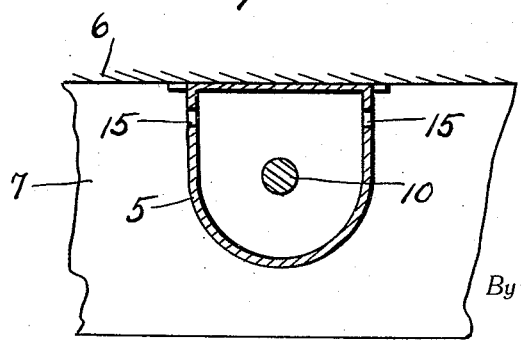

UNITED STATES PATENT OFFICE

LE ROY JONES, OF LEGION, TEXAS

AUTOMOBILE VISOR

Application filed August 13, 1929. Serial No. 385,512.

The present invention relates to a visor for use in connection with automobiles and has for its object to provide, in a manner as hereinafter set forth, a visor capable of being adjustably positioned to protect the eyes of the driver of a vehicle, without shutting off the driver's vision of the road before him from the blinding effect from the glare from the headlights of an approaching vehicle, from the sun rays and from snow and sand as well as the effect of rain or snow striking the windshield of the vehicle.

A still further important object of the invention resides in the provision of a visor of this nature which is exceedingly simple in its construction, inexpensive to manufacture, strong and durable, compact and convenient, readily installed with respect to an automobile, clearly efficient and reliable in its use and operation, easy to adjust, comparatively inexpensive to manufacture, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a vertical longitudinal section through the forward portion of the top of an automobile showing my improved structure incorporated therewith, Figure 2 is a longitudinal section through the structure, Figure 3 is a transverse section taken substantially on the line 3—3 of Figure 1, Figure 4 is a top plan view of the structure showing a portion of the casing and section, Figure 5 is a perspective view showing fragmentarily the visor, Figure 6 is a perspective view showing the rear end of the casing, Figure 7 is a perspective view of one of the links, and Figure 8 is a perspective view of the slide block.

Referring to the drawings in detail it will be seen that the numeral 5 denotes an elongated casing disposed under the top 6 of an automobile forwardly of the upper rail 7 of the windshield frame and the rear end of the casing is open while the forward end thereof is closed by an upwardly inclined plate 8.

A bearing 9 is provided in the front end of the casing 5. A shaft 10 has the intermediate portion thereof threaded and the forward end journaled in the block 9 while the rear end is journaled through the rail 7 and has an operating knob 11 thereon.

A slide block 12 is mounted in the casing and the shaft 10 is threaded therethrough. Links 14 are pivotally engaged with the block 12 extending through slots 15 formed in the side of the casing 5.

Frames 17 have transparent panels 18 mounted therein and are swingably mounted on a horizontal rod 19 mounted in a sleeve 20 formed on the front end of the casing 5. These frames 17 are connected by bowed bars 21. Links 14 are pivotally engaged with adjacent ends of the frames 17.

From the above detailed description it will be seen that by turning the knob 11 the frames 17 may be swung inwardly far enough to be horizontally disposed under the top 6 with the bars 21 located circumjacent the casing 7 or by turning the knob 11 in the opposite direction the frames 17 may be located at any desired angle in depending relation with the top 6. Thus the visors formed by the panels 18 which may be of any desired color may be disposed to the best advantage depending upon the nature of the weather that is whether it is the sun rays, oncoming headlight rays or whether it is snow, sleet or rain which it is desired to overcome the ill effects of.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, in the combination and arrangement of parts may be resorted to without departing from the spirit or scope of the invention as hereinafter claimed or sacrificing any of its advantages.

Having thus described my invention, what I claim as new is:

1. In a structure of the class described, an elongated casing, a slide in the casing, means for moving the slide, links connected with the slide through slots formed in the casing, a frame, means for swingably mounting the frame on the casing, said links being pivotally engaged with said frame, said frame including a pair of sections, transparent panels in said sections, arcuate bars connecting said sections so that they may be swung up to positions alongside of the casing with said bars circumjacent the under portion of said casing.

2. In a structure of the class described, an elongated casing, a slide in the casing, means for moving the slide, links connected with the slide through slots formed in the casing, a frame, means for swingably mounting the frame on the casing, said links being pivotally engaged with said frame, said frame including a pair of sections, transparent panels in said sections, arcuate bars connecting said sections so that they may be swung up to positions alongside of the casing with said bars circumjacent the under portion of said casing, said means for moving the slide comprising a threaded shaft through the slide and journalled in the casing.

3. In a structure of the class described, an elongated casing, a slide in the casing, means for moving the slide, links connected with the slide through slots formed in the casing, a frame, means for swingably mounting the frame on the casing, said links being pivotally engaged with said frame, said frame including a pair of sections, transparent panels in said sections, arcuate bars connecting said sections so that they may be swung up to positions alongside of the casing with said bars circumjacent the under portion of said casing, said means for moving the slide comprising a threaded shaft through the slide and journalled in the casing, a knob on the shaft for operation thereof.

In testimony whereof I affix my signature.

LE ROY JONES.